United States Patent
Horton

[11] Patent Number: 6,161,784
[45] Date of Patent: Dec. 19, 2000

[54] APPARATUS FOR CONDITIONING AND DISPENSING A MIXTURE OF WET AND DRY LOOSE FILL INSULATION MATERIAL

[75] Inventor: Paul H. Horton, Hollis, Okla.

[73] Assignee: Western Fibers, Inc., Hollis, Okla.

[21] Appl. No.: 09/374,436

[22] Filed: Aug. 13, 1999

[51] Int. Cl.[7] .......................... A01C 15/04; A01C 19/00; E01C 19/20
[52] U.S. Cl. ........................ 239/654; 239/650; 239/655; 239/671; 239/672; 239/675; 239/683; 406/52
[58] Field of Search .................................. 239/650, 654, 239/655, 656, 667, 671, 672, 675, 683; 406/52, 109, 117, 118, 120, 122, 151, 181

[56] References Cited

U.S. PATENT DOCUMENTS

| | | |
|---|---|---|
| 1,413,345 | 4/1922 | Morris . |
| 2,306,698 | 12/1942 | Heller . |
| 2,517,903 | 8/1950 | Luhrmann .............................. 198/220 |
| 2,550,354 | 4/1951 | Jacobsen ..................................... 91/8 |
| 2,861,294 | 11/1958 | Glaxner et al. ............................... 18/1 |
| 3,043,455 | 7/1962 | Post ................................... 239/672 X |
| 3,063,723 | 11/1962 | Toft .................................... 239/672 X |
| 3,244,408 | 4/1966 | Brownlie et al. ........................... 259/6 |
| 3,529,870 | 9/1970 | Woten ...................................... 302/49 |
| 3,807,646 | 4/1974 | Leiter et al. .............................. 241/60 |
| 4,852,809 | 8/1989 | Davis et al. ......................... 239/672 X |
| 4,978,252 | 12/1990 | Sperber .................................... 406/64 |
| 5,031,546 | 7/1991 | Amos et al. ........................ 239/683 X |
| 5,603,452 | 2/1997 | Hester ................................ 239/683 X |
| 5,788,163 | 8/1998 | Woten et al. ....................... 239/656 X |
| 5,829,649 | 11/1998 | Horton .................................... 22/636 |

FOREIGN PATENT DOCUMENTS

| 2099776 | 12/1982 | United Kingdom . |
|---|---|---|
| 2193478 | 2/1988 | United Kingdom . |

*Primary Examiner*—Andres Kashnikow
*Assistant Examiner*—Robin O. Evans
*Attorney, Agent, or Firm*—Dunlap, Codding & Rogers, P.C.

[57] ABSTRACT

An apparatus for conditioning and dispensing a mixture of wet and dry insulation material is provided. The apparatus includes a hopper with a partition disposed in the hopper so as to define a wet material receiving compartment and a dry material receiving compartment. A plurality of shafts are rotatably and longitudinally supported in the hopper. The shafts are provided with helically arranged spikes which serve to incorporate the wet and dry insulation material together, as well as condition the insulation material. A lower shaft acts to convey the wet insulation material to an air lock while a pair of upper shafts function to incorporate the dry insulation material into the wet insulation material at various points.

18 Claims, 5 Drawing Sheets

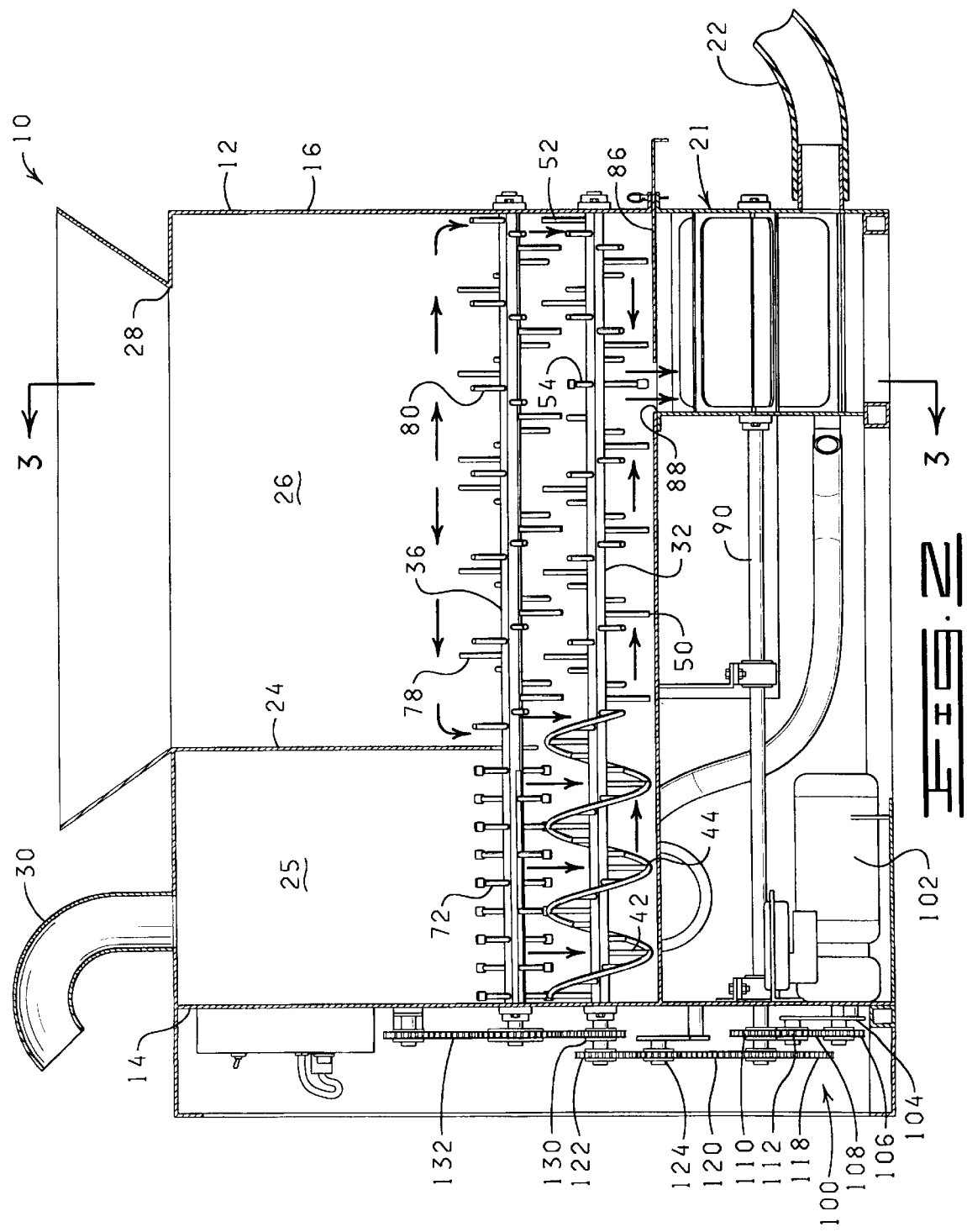

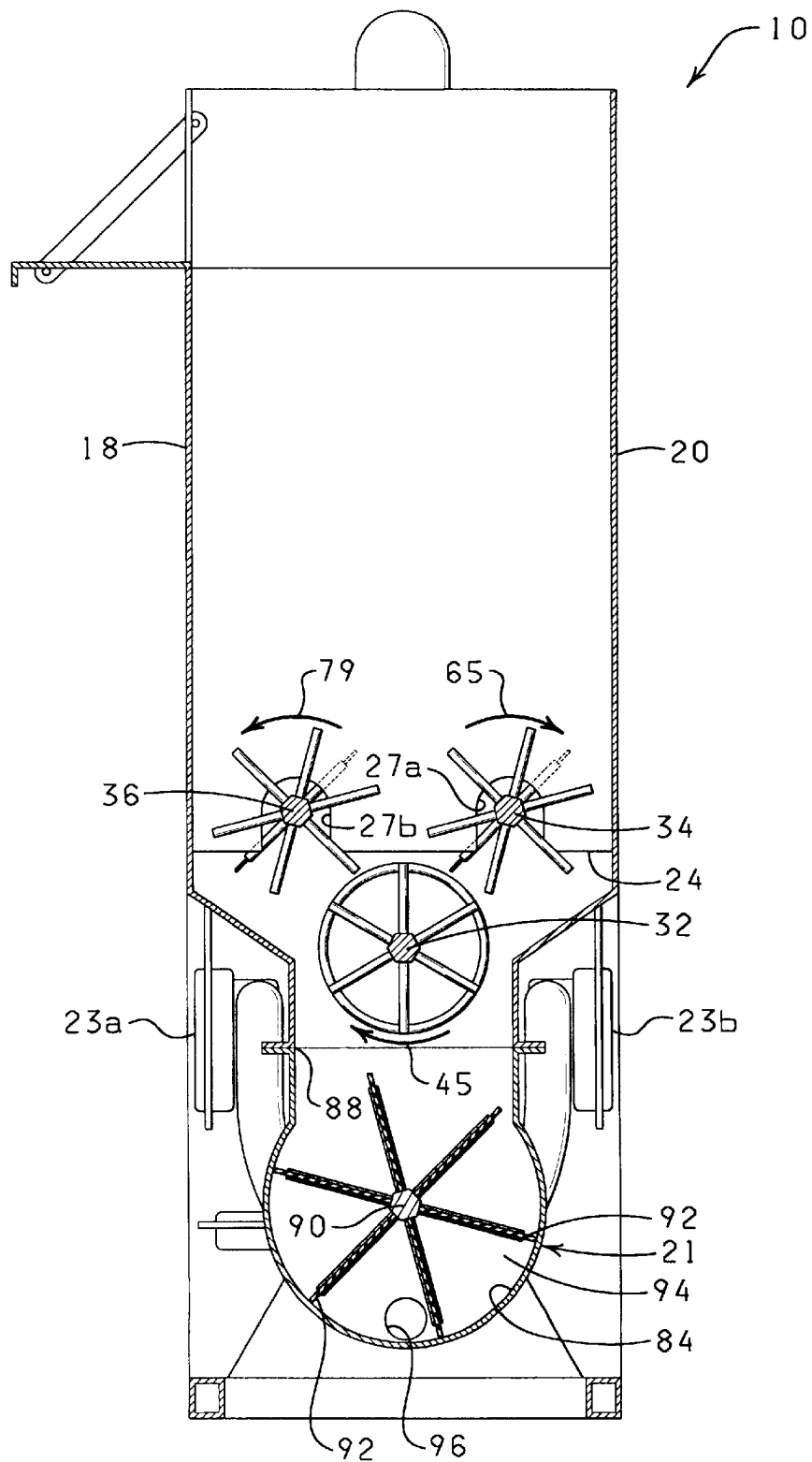

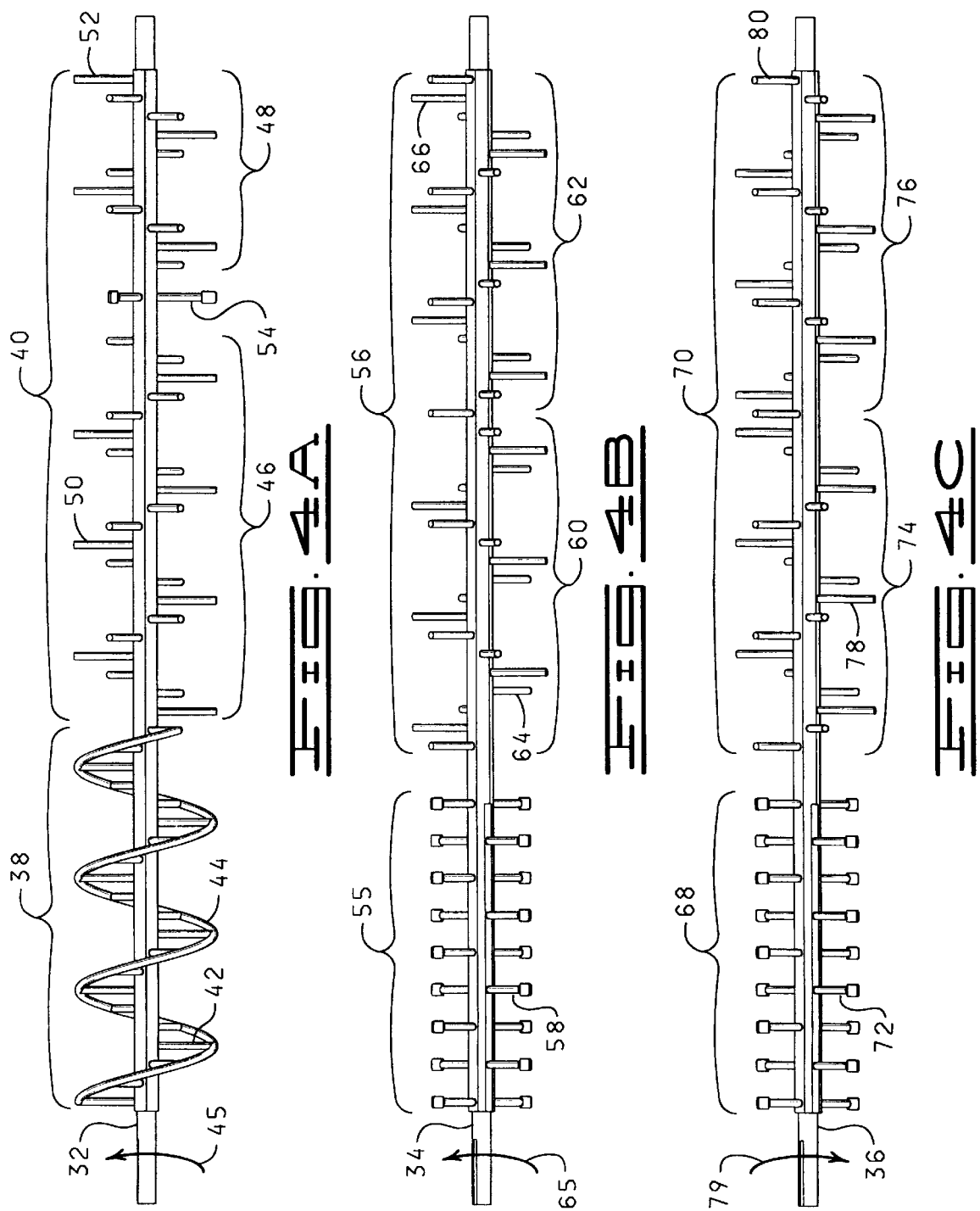

APPARATUS FOR CONDITIONING AND DISPENSING A MIXTURE OF WET AND DRY LOOSE FILL INSULATION MATERIAL

BACKGROUND OF THE INVENTION

1. Field of the Invention

The present invention relates generally to machines for conditioning and dispensing insulation materials, and more particularly, but not by way of limitation, to an improved apparatus for mixing, conditioning, and dispensing a mixture of wet and dry loose fill insulation materials.

2. Brief Description of the Related Art

Fibrous materials such as glass fiber materials, cellulose fibers, expanded mica, granulated rock wool, and granulated mineral fiber wools, have long been used to insulate walls and attics. These materials are commonly known as "loose fill" insulation material. Loose fill insulation materials are often blown into attics and walls in a dry and "fluffy" condition. This dry material will be referred to hereinafter as "dry insulation material". To provide the insulation material with adhesion qualities that will cause the insulation material to stick or bond to a selected surface, dry insulation material is moistened and treated with an adhesive during the blowing process. This moistened material will be referred to hereinafter as "wet insulation material".

Once the insulation material has been blown onto a surface, a portion of the material is often scraped off of the surface to provide a level or even layer of insulation. As a result, a substantial quantity of insulation material is wasted. In an effort to recycle the scraped off material, it is occasionally mixed with additional dry material. However, problems are often encountered in that the wet and dry material are not properly proportioned and conditioned, thus resulting in clumps forming in the insulation material or the wet portion of the material becoming to wet upon being remoistened which can negatively alter the density of the insulation material. Well mixed and conditioned insulation material is more easily dispensed and applies more evenly and thoroughly. Thus, the conditioning of the insulation material is important in that it significantly affects both the application and the performance of the insulation material.

To this end, a need exists for an apparatus which can effectively mix and condition recycled wet insulation material with dry insulation material and dispense the conditioned insulation material. It is to such an apparatus that the present invention is directed.

BRIEF SUMMARY OF THE INVENTION

The present invention is related to an apparatus for conditioning and dispensing wet and dry insulation material. The apparatus includes a hopper with a partition disposed in the hopper so as to define a wet material receiving compartment and a dry material receiving compartment. A plurality of shafts are rotatably and longitudinally supported in the hopper. A first shaft is rotatably and longitudinally supported in the hopper. The first shaft has a wet section disposed within the wet material receiving compartment and a dry section disposed within the dry material receiving compartment. The wet section of the first shaft has a plurality of spikes extending radially therefrom in a helical pattern configured to cause movement of insulation material from the wet material receiving compartment into the dry material receiving compartment. The dry section of the first shaft has a first segment positioned adjacent to the wet section of the first shaft and having a plurality of spikes extending radially therefrom in a helical pattern configured to cause movement of insulation material away from the wet material receiving compartment. The dry segment further has a second segment having a plurality of spikes extending radially therefrom in a helical pattern configured to cause movement of dry insulation material toward the wet material receiving compartment upon rotation of the first shaft.

A second shaft has a wet section disposed within the wet material receiving compartment and a dry section disposed within the dry material receiving compartment. The wet section of the second shaft has plurality of spikes extending radially therefrom. The dry section of the second shaft has a first segment positioned adjacent to the wet section of the second shaft and has a plurality of spikes extending radially therefrom in a helical pattern configured to cause movement of dry insulation material toward the partition and down toward the first shaft so as to cause dry insulation material to be incorporated into wet insulation material and a second segment with a plurality of spikes extending radially therefrom in a helical pattern configured to cause movement of dry insulation material away from the partition and down toward the second section of the first shaft upon rotation of the second shaft.

The apparatus further includes a motor operably linked to the first and second shafts for rotating each of the first and second shafts; an air lock positioned below the dry material receiving compartment of the hopper in open communication therewith for receiving the conditioned insulation material from the dry material receiving compartment of the hopper; and a blower connected to the air lock for discharging the conditioned insulation material from the air lock.

The objects, features and advantages of the present invention will become apparent from the following detailed description when read in conjunction with the accompanying drawings and appended claims.

BRIEF DESCRIPTION OF THE SEVERAL VIEWS OF THE DRAWINGS

FIG. 2 is a cutaway, side elevational view of the apparatus of FIG. 1.

FIG. 3 is a cross sectional view taken along line 3—3 in FIG. 2.

FIG. 4A is a side elevational view of a first shaft.

FIG. 4B is a side elevational view of a second shaft.

FIG. 4C is a side elevational view of a third shaft.

DETAILED DESCRIPTION OF THE INVENTION

Figure 1:
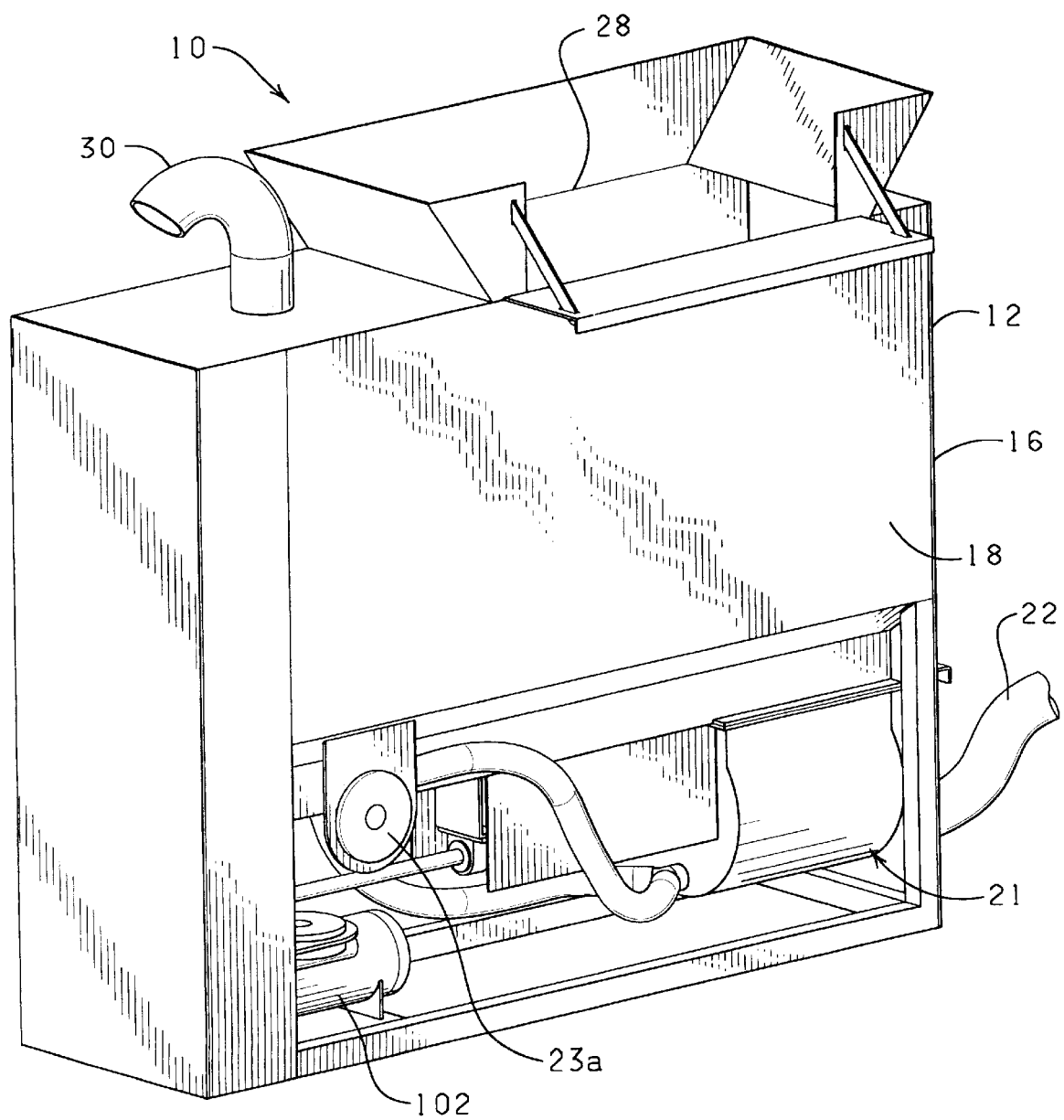
FIG. 1 is a perspective view of an apparatus constructed in accordance with the present invention for conditioning and dispensing a mixture of dry and wet insulation material.

Referring now to the drawings, and more particularly to FIGS. 1–3, an apparatus 10 constructed in accordance with the present invention for conditioning and dispensing a mixture of dry and wet insulation material is illustrated. The apparatus 10 includes a hopper 12. The hopper 12 has a first end 14, a second end 16, a first side 18, and a second side 20 (FIG. 3). The insulation material is mixed and conditioned in the hopper 12 and then conveyed to an air lock 21 where it is selectively discharged through a hose 22 by a pair of blowers 23a and 23b.

A partition 24 is secured in the hopper 12 so as to define a wet material receiving compartment 25 and a dry material receiving compartment 26. The partition 24 is constructed of a plate material and traverses the hopper 12 from the first side 18 to the second side 20. The partition 24 further has a pair of notches 27a and 27b (FIG. 3) formed in the lower end thereof. The lower end of the partition 24 terminates a distance from the bottom of the hopper 12 such that the lower portion of the wet material receiving compartment 25 is an open communication with the lower portion of the dry material receiving compartment 26, as substantially shown in FIGS. 2 and 3.

The hopper 12 further includes a first inlet 28 for introducing dry insulation material into the dry material receiving compartment 26 and a second inlet 30 for introducing wet insulation material into the wet material receiving compartment 25. The first inlet insert 28 is shown to be an opening in the top of the hopper 12 while the second inlet 30 is shown to be a curved pipe. The curved pipe allows the wet insulation material to be blown into the wet material receiving compartment 25 in a manner well known in the art, if desired. Alternatively, the second inlet 30 can be similar to the first inlet 28 whereby the wet insulation material is placed directly into the wet material receiving compartment 25.

The wet material receiving compartment 25 extends between the partition 24 and the first end 14 of the hopper 12, and the dry material receiving compartment 26 extends between the partition 24 and the second end 16 of the hopper 12. As shown in FIG. 2, the wet material receiving compartment 25 has a length less than the dry material receiving compartment 26.

The apparatus 10 employs a plurality of shafts rotatably and longitudinally supported in the hopper 12 for mixing and conditioning dry insulation material and wet insulation material. As more closely shown in FIG. 3, the shafts include a first shaft 32, a second shaft 34, and a third shaft 36. As best illustrated in FIG. 4A, the first shaft 32 is rotatably and longitudinally supported in the hopper 12. The first shaft 32 is characterized as having a wet section 38 which is disposed within the wet material receiving compartment 25 and a dry section 40 which is disposed within the dry material receiving compartment 26. The wet section 38 of the first shaft 32 is provided with a plurality of spikes 42 (only one being designated in FIG. 4A) extending radially therefrom in a helical pattern designed to cause movement of insulation material from the wet material receiving compartment 25 into the dry material receiving compartment 26 upon rotation of the first shaft 32 in a direction indicated by arrow 45 (FIG. 3). To further enhance the movement of insulation material from the wet material receiving compartment 25 to the dry material receiving compartment 26, a spiral rod 44 is fashioned on the ends of the spikes 42.

The dry section 40 of the first shaft 32 includes a first segment 46 positioned adjacent to the wet section 38 of the first shaft 32 and a second section 48. The first segment 46 has a plurality of spikes 50 (only one being designated in FIG. 4A) extending radially therefrom in a helical pattern configured to cause movement of insulation material away from the wet material receiving compartment 25, while the second section 48 has a plurality of spikes 52 (only one being designated in FIG. 4A) extending radially therefrom in a helical pattern configured to cause movement of dry insulation material toward the wet material receiving compartment 25 upon rotation of the first shaft 32 in the direction 45. The first shaft 32 further has a plurality of push spikes 54 extending radially therefrom between the spikes 50 of the first segment 46 of the first shaft 32 and the spikes 52 of the second section 48 of the first shaft 32 for feeding the conditioned insulation material into the air lock 21. Each of the push spikes 54 of the first shaft 32 has a flattened distal end.

The second shaft 34 is rotatably and longitudinally supported in the hopper 12 above the first shaft 32 in a generally parallel relationship with respect to the first shaft 32. As best illustrated in FIG. 4B, the second shaft 34 has a wet section 55 disposed within the wet material receiving compartment 25 and a dry section 56 disposed within the dry material receiving compartment 26. The second shaft 34 is extended through the notch 27a (FIG. 3) of the partition 24 so that the partition 24 substantially isolates the wet section 55 and the dry section 56 of the second shaft 34 thereby preventing the transfer of a significant amount of material between the wet material receiving compartment 25 and the dry material receiving compartment 26 via the second shaft 34.

The wet section 55 of the second shaft 34 has a plurality of spikes 58 (only one being designated in FIG. 4B) extending radially therefrom. Each of the spikes 58 is provided with a flattened distal end to facilitate movement of wet insulation material downward toward the wet section 38 of the first shaft 32.

The dry section 56 of the second shaft 34 has a first segment 60 positioned adjacent to the wet section 55 of the second shaft 34 and a second segment 62. The first segment 60 has a plurality of spikes 64 (only one being designated in FIG. 4B) extending radially therefrom in a helical pattern configured to cause movement of a portion of the dry insulation material toward the partition 24 and, in turn, downward toward the first segment 46 of the first shaft 32 so as to cause the dry insulation material to be incorporated into the wet insulation material upon rotation of the second shaft 34 in a direction indicated by arrow 65. The second segment 62 has a plurality of spikes 66 extending radially therefrom in a helical pattern configured to cause movement of additional dry insulation material away from the partition 24 and downward toward the second section 48 of the first shaft 32 upon rotation of the second shaft 34 in the direction 65.

The third shaft 36 is rotatably and longitudinally supported in the hopper 12 in a generally parallel, horizontal relationship with respect to the second shaft 34. As best illustrated in FIG. 4C, the third shaft 36 has a wet section 68 disposed within the wet material receiving compartment 25 and a dry section 70 disposed within the dry material receiving compartment 26. The third shaft 36 is extended through the notch 27b (FIG. 3) of the partition 24 so that the partition 24 substantially isolates the wet section 55 and the dry section 56 of the second shaft 34 thereby preventing the transfer of a substantial amount of material between the wet material receiving compartment 25 and the dry material receiving compartment 26 via the third shaft 36.

The wet section 68 of the third shaft 36 has a plurality of spikes 72 (only one being designated in FIG. 4C) extending radially therefrom. Each of the spikes 72 is provided with a flattened distal end to facilitate movement of insulation material downward toward the wet section 38 of the first shaft 32.

The dry section 70 of the third shaft 36 has a first segment 74 positioned adjacent to the wet section 68 of the third shaft 36 and a second segment 76. The first segment 74 has a plurality of spikes 78 (only one being designated in FIG. 4C) extending radially therefrom in a helical pattern configured to cause movement of additional dry insulation material toward the partition 24 and downward toward the first segment 46 of the first shaft 32 so as to cause more dry insulation material into the wet insulation material being conveyed into the dry material receiving compartment 26 by the first shaft 32 upon rotation of the third shaft 36 in a direction indicated by arrow 79. The second segment 76 has a plurality of spikes 80 extending radially therefrom in a helical pattern configured to cause movement of dry insulation material away from the wet material receiving compartment 25 and downward toward the second section 48 of the first shaft 32 upon rotation of the third shaft 36 in the direction 79, which is opposite in direction of rotation 65 of the second shaft 34.

The air lock assembly 21 includes an air lock chamber 84 positioned below the dry material receiving compartment 26 of the hopper 12 so as to receive conditioned loose fill insulation material from the dry material receiving compartment 26 of the hopper 12. More particularly, the air lock 21 is position directly below the push spikes 54 of the first shaft 32 which facilitate insertion of the conditioned insulation material into the air lock 21. The flow of conditioned insulation material from the dry material receiving compartment 26 of the hopper 12 into the air lock chamber 84 is selectively controlled via a partition 86 (FIG. 2), which is slidable across an opening 88 between the dry material receiving compartment 26 of the hopper 12 and the air lock chamber 84 of the air lock 21. As shown in FIG. 3, the air lock chamber 84 of the air lock 21 has a substantially circular cross-section. A shaft 90 is extended longitudinally through the air lock chamber 84. A plurality of blades or vanes 92 extend radially from the shaft 90, and pockets (i.e., a pocket 94 as shown in FIG. 3) are defined by the area between adjacent blades 92. As the shaft 90 is rotated, amounts of conditioned insulation material are received in each pocket 94 through the opening 88 as the pocket 94 rotates past the opening 88. The partition 86 is adjusted to regulate the amount of material entering each pocket 94. As the shaft 90 rotates, the blades 92 contact the inner wall of the air lock chamber 84, thus sealing off the pocket 94 containing the conditioned loose fill insulation material. Airflow from the set of blowers 23a and 23b enters the air lock chamber 84 of the air lock 21 through an opening 96 (FIG. 3) near the bottom of the air lock chamber 84 and forces the conditioned loose fill insulation material in the pocket 94 through the hose 22 (FIG. 2).

Figure 5:
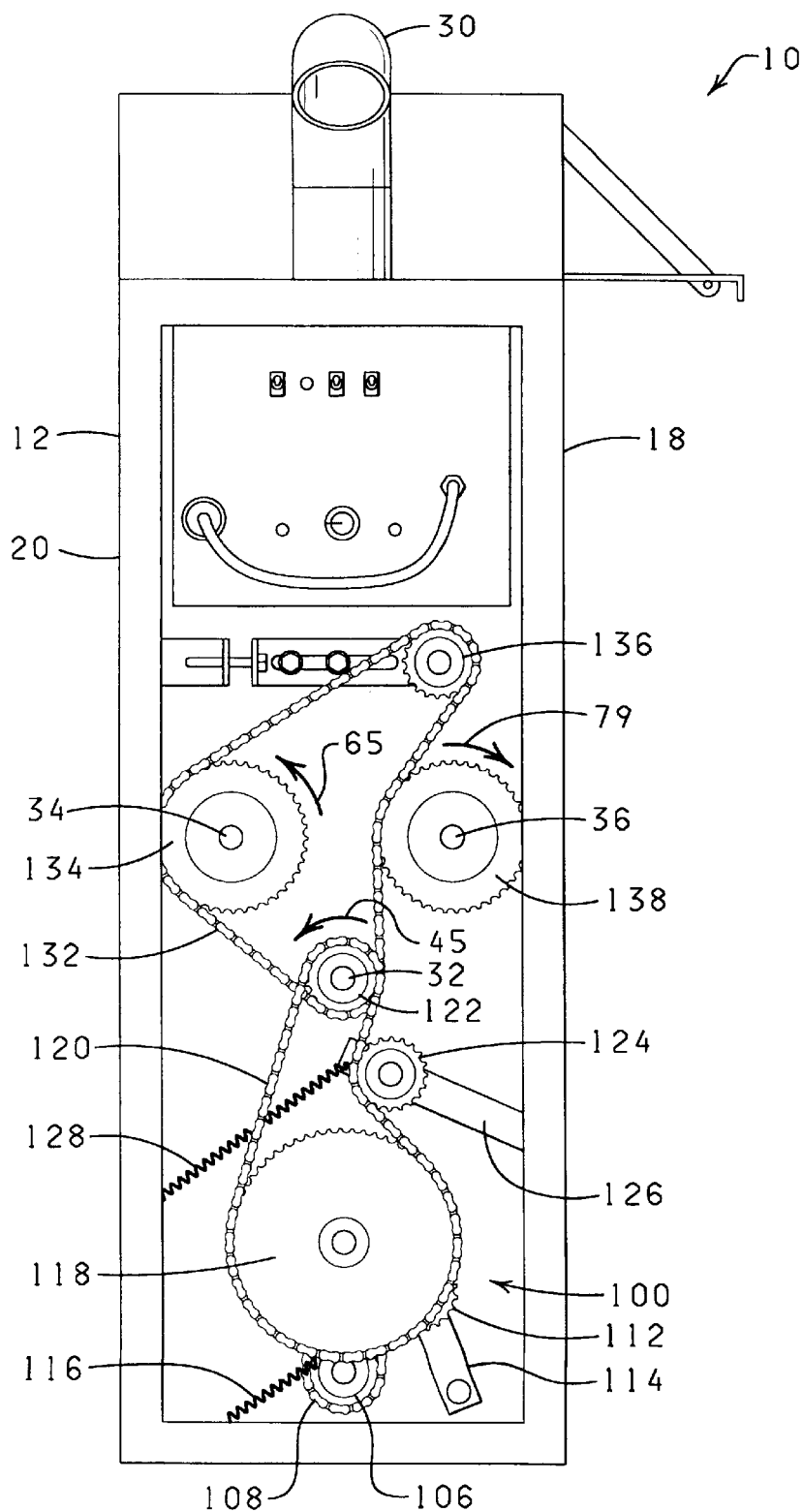
FIG. 5 is an end view of the apparatus of FIG. 1 having a first end of the hopper removed therefrom.

The first, second, and third shafts 32, 34, and 36 positioned in the hopper 12 and the shaft 90 positioned in the air lock chamber 84 are operatively driven by a drive assembly 100 which includes a motor 102 (FIGS. 1 and 2) and a series of chains and sprockets. The drive assembly 100 is best shown in FIGS. 2 and 5, to which attention is now directed.

The motor 102 has a drive shaft 104 which carries a drive sprocket 106. The drive sprocket 106 drives a chain 108 passing around the sprocket 106 and a sprocket 110. The sprocket 110 is fixed on the shaft 90 which extends through the air lock chamber 84. An idler sprocket 112, which is held in contact with the chain 108 by an idler arm 114 and an idler spring 116, maintains the tension of the chain 108 so that power is effectively transmitted from the motor 102 to the sprocket 110 which drives the shaft 90.

The shaft 90 has another sprocket 118 fixed thereon in a concentric relationship with respect to the sprocket 110. The sprocket 118 has a diameter greater than the sprocket 110 and drives a chain 120 passing around a sprocket 122 carried on the end of the first shaft 32. An idler sprocket 124, which is held in contact with the chain 120 by an idler arm 126 and an idler spring 128, maintains the tension of the chain 120 so that power is effectively transmitted from the sprocket 118 to the sprocket 122 which drives the first shaft 32.

Another sprocket 130 (FIG. 2) is attached to the first shaft 32 in a concentric relationship with the respect to the sprocket 122. The sprocket 130 drives a chain 132 passing over a sprocket 134 which is carried on the end of the second shaft 34, over an idler sprocket 136, and under a sprocket 138, which is carried on the end of the third shaft 36, such that power is transmitted from the first shaft 32 to the second and third shafts 34 and 36 with the first shaft 32 and the second shaft 34 rotated in one direction while the third shaft 36 is rotated in the opposite direction.

The size and type of motor 102, as well as the size of the various chains and sprockets, are selected to provide a desired rotation rate. In most situations, it is desirable that the first shaft 32 be rotated about twice the rate of rotation the second and third shafts 34 and 36. The motor 102, the various sprockets and chains should be selected accordingly. In most instances a 2 horsepower motor which operates on 220/240 household current will be sufficient.

Referring again to FIG. 2, in operation of the apparatus 10, the wet material receiving compartment 25 of the hopper 12 is loaded with wet insulation material and the dry material receiving compartment 26 is loaded with dry insulation material. Operation of the drive assembly 100 causes the first and second shafts 32 and 34 to rotate in a counter-clockwise direction relative to the first end 14 of the hopper 12 and the third shaft 36 to rotate in a clockwise direction.

In this way, the spikes 58 of the second shaft 34 (FIG. 4B) and the spikes 72 of the third shaft 36 (FIG. 4C) cause wet insulation material to be conveyed to the sides of the hopper 12 and downward toward the wet section 38 of the first shaft 32. The spikes 58 and 72 also condition the wet insulation material by cutting through and dispersing the fibers into smaller clumps. The spikes 42 of the wet section 38 of the first shaft 32 (FIG. 4A) roll the wet insulation material from the wet material receiving compartment 25 into the dry material receiving compartment 26 where a portion of the dry insulation material disposed in the dry material receiving compartment 26 is incorporated into the wet insulation material. More particularly, the spikes 64 of the first segment 60 of the second shaft 34 (FIG. 4b) and the spikes 78 of the first segment 74 of the third shaft 36 (FIG. 4C) cause a portion of the dry insulation material to be moved toward the partition 24 which then directs the dry insulation material downward toward the second section 48 of the first shaft 32 (FIG. 4A) where the dry insulation material is incorporated into the wet insulation material. The spikes 50 of the first segment 46 of the first shaft 32 convey this mixture of wet and dry insulation material toward the push spikes 54 of the first shaft 32. In addition to conveying the material toward the airlock 21, the spikes 50 continue to condition the insulation material by cutting through and dispersing the fibers into smaller clumps.

The spikes 66 of the second segment 62 of the second shaft 34 (FIG. 4B) and the spikes 80 of the second segment 76 of the third shaft 36 (FIG. 4c) cause another portion of the dry insulation material to move toward the second end 16 of the hopper 12 and downward toward the second section 48 of the first shaft 32. The spikes 52 of the second section 48 of the first shaft 32 in turn move the dry insulation material toward the push spikes 54 where the dry insulation material conveyed by the second section 48 of the first shaft 32 is mixed into the mixture of wet insulation material and dry insulation material conveyed by the first segment 46 of the first shaft 32. The push spikes 54 act to force the conditioned insulation material through the opening 88 of the air lock 21.

As the shaft 90 of the air lock 21 is rotated, amounts of conditioned insulation material are received in each pocket 94 (FIG. 3) through the opening 88 as the pockets 94 rotate past the opening 88. The amount of material entering each pocket 94 is controlled by the position of the partition 86. Air flow from the blowers 23*a* and 23*b* (FIG. 3) enters the airlock chamber 84 and forces the material in the corresponding pocket 94 through the hose 22.

From the above description, it is clear that the present invention is well adapted to carry out the objects and to attain the advantages mentioned herein as well as those inherent in the invention. While a presently preferred embodiment of the invention has been described for purposes of this disclosure, it will be understood that numerous changes may be made which will readily suggest themselves to those skilled in the art and which are accomplished within the spirit of the invention disclosed and as defined in the appended claims.

What is claimed:

1. An apparatus for conditioning and dispensing a mixture of wet and dry insulation material, comprising:

a hopper having a first end and a second end;

a partition disposed in the hopper so as to define a wet material receiving compartment and a dry material receiving compartment;

a first shaft rotatably and longitudinally supported in the hopper, the first shaft having a wet section disposed within the wet material receiving compartment and a dry section disposed within the dry material receiving compartment, the wet section of the first shaft having a plurality of spikes extending radially therefrom in a helical pattern configured to cause movement of wet insulation material from the wet material receiving compartment into the dry material receiving compartment, the dry section of the first shaft having a first segment positioned adjacent to the wet section of the first shaft and having a plurality of spikes extending radially therefrom in a helical pattern configured to cause movement of insulation material away from the wet material receiving compartment and a second segment having a plurality of spikes extending radially therefrom in a helical pattern configured to cause movement of dry insulation material toward the wet material receiving compartment upon rotation of the first shaft;

a second shaft rotatably and longitudinally supported in the hopper above the first shaft in a generally parallel relationship with respect to the first shafts the second shaft having a wet section disposed within the wet material receiving compartment and a dry section disposed within the dry material receiving compartment, the wet section of the second shaft having plurality of spikes extending radially therefrom, the dry section of the second shaft having a first segment positioned adjacent to the wet section of the second shaft and having a plurality of spikes extending radially therefrom in a helical pattern configured to cause movement of dry insulation material toward the partition and downward toward the first shaft so as to cause dry insulation material to be incorporated into wet insulation material and a second segment with a plurality of spikes extending radially therefrom in a helical pattern configured to cause movement of dry insulation material away from the partition and downward toward the second section of the first shaft upon rotation of the second shaft;

a motor operably linked to the first and second shafts for rotating each of the first and second shafts;

an air lock positioned below the dry material receiving compartment of the hopper in open communication therewith for receiving the conditioned insulation material from the dry material receiving compartment of the hopper; and a blower connected to the air lock for discharging the conditioned insulation material from the air lock.

2. The apparatus of claim 1 wherein the first shaft has a spiral rod supported on the ends of the spikes extending from the wet section.

3. The apparatus of claim 1 wherein each of the spikes extending from the wet section of the second shaft have a flattened distal end.

4. The apparatus of claim 1 wherein the first shaft further has a plurality of dividing spikes extending radially therefrom between the spikes of the first segment of the first shaft and the spikes of the second segment of the first shaft for feeding the conditioned insulation material into the air lock.

5. The apparatus of claim 4 wherein each of the dividing spikes of the first shaft has a flattened distal end.

6. The apparatus of claim 1 further comprising:

a slidable partition supported in the bottom of the hopper to adjust the size of an access opening of the air lock whereby the flow of conditioned loose fill insulation material from the hopper into the air lock may be selectively regulated.

7. An apparatus for conditioning and dispensing a mixture of wet and dry insulation material, comprising:

a hopper having a first end and a second end;

a partition disposed in the hopper so as to define a wet material receiving compartment and a dry material receiving compartment;

a first shaft rotatably and longitudinally supported in the hopper, the first shaft having a wet section disposed within the wet material receiving compartment and a dry section disposed within the dry material receiving compartment, the wet section of the first shaft having a plurality of spikes extending radially therefrom in a helical pattern configured to cause movement of wet insulation material from the wet material receiving compartment into the dry material receiving compartment, the dry section of the first shaft having a first segment positioned adjacent to the wet section of the first shaft and having a plurality of spikes extending radially therefrom in a helical pattern configured to cause movement of insulation material away from the wet material receiving compartment and a second segment having a plurality of spikes extending radially therefrom in a helical pattern configured to cause movement of dry insulation material toward the wet material receiving compartment upon rotation of the first shaft;

a second shaft rotatably and longitudinally supported in the hopper above the first shaft in a generally parallel relationship with respect to the first shaft, the second shaft having a wet section disposed within the wet material receiving compartment and a dry section disposed within the dry material receiving compartment, the wet section of the second shaft having plurality of spikes extending radially therefrom, the dry section of the second shaft having a first segment positioned adjacent to the wet section of the second shaft and having a plurality of spikes extending radially therefrom in a helical pattern configured to cause movement of dry insulation material toward the partition and downward toward the first shaft so as to cause a first portion of the dry insulation material to be incorporated into wet insulation material and a second segment with a plurality of spikes extending radially therefrom in a helical pattern configured to cause movement of another portion of the dry insulation material away from the wet material receiving compartment and downward toward the second segment of the first shaft upon rotation of the second shaft where the second portion of the dry insulation material is mixed with the mixture of the wet insulation material and the first portion of the dry insulation material;

a third shaft rotatably and longitudinally supported in the hopper in a generally parallel, horizontal relationship with respect to the second shaft, the third shaft having a wet section disposed within the wet material receiving compartment and a dry section disposed within the dry material receiving compartment, the wet section of the third shaft having plurality of spikes extending radially therefrom, the dry section of the third shaft having a first segment positioned adjacent to the wet section of the third shaft and having a plurality of spikes extending radially therefrom in a helical pattern configured to cause movement of dry insulation material toward the partition and downward toward the first shaft so as to cause a first portion of the dry insulation material to be incorporated into wet insulation material and a second segment with a plurality of spikes extending radially therefrom in a helical pattern configured to cause movement of a second portion of the dry insulation material away from the wet material receiving compartment and downward toward the second segment of the first shaft upon rotation of the third shaft where the second portion of the dry insulation material is mixed with the mixture of the wet insulation material and the first portion of the dry insulation material;

a motor operably linked to the first, second, and third shafts for rotating each of the first, second, and third shafts;

an air lock positioned below the dry material receiving compartment of the hopper in open communication therewith for receiving the conditioned insulation material from the dry material receiving compartment of the hopper; and a blower connected to the air lock for discharging the conditioned insulation material from the air lock.

8. The apparatus of claim 7 wherein the one of the second and third shafts is adapted to be rotated in a direction opposite the other two shafts.

9. The apparatus of claim 7 wherein the first shaft has a spiral rod supported on the ends of the spikes extending from the wet section.

10. The apparatus of claim 7 wherein each of the spikes extending from the wet section of the second and third shafts have a flattened distal end.

11. The apparatus of claim 7 wherein the first shaft further has a plurality of dividing spikes extending radially therefrom between the spikes of the first segment of the first shaft and the spikes of the second segment of the first shaft for feeding conditioned insulation material into the air lock.

12. The apparatus of claim 11 wherein each of the dividing spikes of the first shaft has a flattened distal end.

13. The apparatus of claim 7 further comprising:

a slidable partition supported in the bottom of the hopper to adjust the size of the access opening of the air lock whereby the flow of conditioned loose fill insulation material from the hopper into the air lock may be selectively regulated.

14. An apparatus for conditioning and dispensing a mixture of wet and dry insulation material, comprising:

a hopper having a first end and a second end;

a partition disposed in the hopper so as to define a wet material receiving compartment and a dry material receiving compartment;

a first shaft rotatably and longitudinally supported in the hopper, the first shaft having a wet section disposed within the wet material receiving compartment and a dry section disposed within the dry material receiving compartment, the wet section of the first shaft having a plurality of spikes extending radially therefrom in a helical pattern and a spiral rod supported on the ends of the spikes extending from the wet section configured to cause movement of insulation material from the wet material receiving compartment into the dry material receiving compartment, the dry section of the first shaft having a first segment positioned adjacent to the wet section of the first shaft and having a plurality of spikes extending radially therefrom in a helical pattern configured to cause movement of insulation material away from the wet material receiving compartment and a second segment having a plurality of spikes extending radially therefrom in a helical pattern configured to cause movement of dry insulation material toward the wet material receiving compartment upon rotation of the first shaft;

a second shaft rotatably and longitudinally supported in the hopper above the first shaft in a generally parallel relationship with respect to the first shaft, the second shaft having a wet section disposed within the wet material receiving compartment and a dry section disposed within the dry material receiving compartment, the wet section of the second shaft having plurality of spikes extending radially therefrom, the dry section of the second shaft having a first segment positioned adjacent to the wet section of the second shaft and having a plurality of spikes extending radially therefrom in a helical pattern configured to cause movement of dry insulation material into the wet material receiving compartment and a second segment with a plurality of spikes extending radially therefrom in a helical pattern configured to cause movement of dry insulation material away from the wet material receiving compartment upon rotation of the second shaft;

a third shaft rotatably and longitudinally supported in the hopper in a generally parallel, horizontal relationship with respect to the second shaft, the third shaft having a wet section disposed within the wet material receiving compartment and a dry section disposed within the dry material receiving compartment, the wet section of the third shaft having plurality of spikes extending radially therefrom, the dry section of the third shaft having a first segment positioned adjacent to the wet section of the third shaft and having a plurality of spikes extending radially therefrom in a helical pattern configured to cause movement of dry insulation material into the wet material receiving compartment and a second segment with a plurality of spikes extending radially therefrom in a helical pattern configured to cause movement of dry insulation material away from the wet material receiving compartment upon rotation of the third shaft in a direction opposite the second shaft;

a motor operably linked to the first, second, and third shafts for rotating each of the first, second, and third shafts;

an air lock positioned below the dry material receiving compartment of the hopper in open communication therewith for receiving the conditioned insulation material from the dry material receiving compartment of the hopper; and a blower connected to the air lock for discharging the conditioned insulation material from the air lock.

15. The apparatus of claim 14 wherein each of the spikes extending from the wet section of the second and third shafts have a flattened distal end.

16. The apparatus of claim 7 wherein the first shaft further has a plurality of dividing spikes extending radially therefrom between the spikes of the first segment of the first shaft and the spikes of the second segment of the first shaft for feeding conditioned insulation material into the air lock.

17. The apparatus of claim 16 wherein each of the dividing spikes of the first shaft has a flattened distal end.

18. The apparatus of claim 14 further comprising:

a slidable partition supported in the bottom of the hopper to adjust the size of the access opening of the air lock whereby the flow of conditioned loose fill insulation material from the hopper into the air lock may be selectively regulated.

* * * * *

UNITED STATES PATENT AND TRADEMARK OFFICE
CERTIFICATE OF CORRECTION

PATENT NO. : 6,161,784
DATED : December 19, 2000
INVENTOR(S) : Paul H. Horton

Page 1 of 1

It is certified that error appears in the above-identified patent and that said Letters Patent is hereby corrected as shown below:

Column 7,
Line 45, delete "shafts" and substitute therefor -- shaft --.

Signed and Sealed this

Twenty-fifth Day of December, 2001

Attest:

*Attesting Officer*

JAMES E. ROGAN
*Director of the United States Patent and Trademark Office*